(12) United States Patent
Suzuki et al.

(10) Patent No.: US 7,673,847 B2
(45) Date of Patent: Mar. 9, 2010

(54) FLUID CONTROL VALVE FOR SUPPLYING GAS TO A FUEL CELL IN A VEHICLE

(75) Inventors: Shigehito Suzuki, Aichi-ken (JP); Daisuke Yamamoto, Aichi-ken (JP); Masakazu Hasegawa, Aichi-ken (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 704 days.

(21) Appl. No.: 11/520,037

(22) Filed: Sep. 13, 2006

(65) Prior Publication Data

US 2007/0063160 A1    Mar. 22, 2007

(30) Foreign Application Priority Data

Sep. 21, 2005 (JP) ............................. 2005-274158
Sep. 21, 2005 (JP) ............................. 2005-274160

(51) Int. Cl.
*F16K 31/02* (2006.01)
(52) U.S. Cl. .................... 251/129.08; 251/129.21
(58) Field of Classification Search .......... 251/129.21, 251/129.08, 129.15; 141/18
See application file for complete search history.

(56) References Cited

U.S. PATENT DOCUMENTS

| | | | | |
|---|---|---|---|---|
| 3,921,670 A * | 11/1975 | Clippard et al. | .......... | 251/129.15 |
| 4,085,921 A * | 4/1978 | Ueda et al. | .......... | 251/129.08 |
| 4,555,060 A | 11/1985 | Knapp et al. | | |
| 4,635,683 A * | 1/1987 | Nielsen | .......... | 251/129.08 |
| 4,988,074 A * | 1/1991 | Najmolhoda | .......... | 251/129.08 |
| 5,158,263 A * | 10/1992 | Shimizu et al. | .......... | 251/129.21 |
| 5,374,029 A | 12/1994 | Bailey | | |
| 5,566,920 A * | 10/1996 | Romann et al. | .......... | 251/129.21 |
| 5,632,467 A * | 5/1997 | Just et al. | .......... | 251/129.21 |
| 5,758,865 A * | 6/1998 | Casey | .......... | 251/129.21 |
| 6,220,569 B1 * | 4/2001 | Kelly | .......... | 251/129.08 |
| 6,299,130 B1 * | 10/2001 | Yew et al. | .......... | 251/129.15 |
| 6,336,621 B1 | 1/2002 | Li et al. | | |
| 6,343,751 B1 | 2/2002 | Ito et al. | | |
| 6,422,488 B1 * | 7/2002 | Fochtman et al. | .......... | 251/129.15 |
| 6,651,701 B2 * | 11/2003 | Kuriiwa et al. | .......... | 141/4 |
| 2003/0049501 A1 * | 3/2003 | Fujita | .......... | 429/20 |
| 2006/0231785 A1 | 10/2006 | Hans et al. | | |

FOREIGN PATENT DOCUMENTS

| | | |
|---|---|---|
| DE | 10261610 A1 * | 7/2004 |
| JP | 09 310656 | 12/1997 |
| JP | 10 231755 | 9/1998 |
| JP | 11 148438 | 6/1999 |
| JP | 11 182377 | 7/1999 |
| JP | 2000 240525 | 9/2000 |

(Continued)

*Primary Examiner*—John Bastianelli
(74) *Attorney, Agent, or Firm*—Dennison, Schultz & Macdonald

(57) ABSTRACT

A movable valve 131 is movably supported by a support plate 135 within a valve body having a gas injection nozzle 129. The valve body consists of a plurality of members 103, 105, 107, 109, 127. Impermeable joints 147a, 147b, 147c are formed between the members. The support plate 135 includes a plurality of elastically deformable support portions each having an inner radial connection, an outer radial connection and a circumferential connection. The support portions are phase adjusted to radial fluid passages 131h formed in the movable valve 113.

4 Claims, 7 Drawing Sheets

| | FOREIGN PATENT DOCUMENTS | | | JP | 2004 239251 | 8/2004 |
|---|---|---|---|---|---|---|
| | | | | WO | 99/61781 | 12/1999 |
| JP | 2000 249022 | 9/2000 | | WO | 03/042526 | 5/2003 |
| JP | 2001 351656 | 12/2001 | | | | |
| JP | 2003 113753 | 4/2003 | | * cited by examiner | | |

FLUID CONTROL VALVE FOR SUPPLYING GAS TO A FUEL CELL IN A VEHICLE

BACKGROUND OF THE INVENTION

1. Field of the Invention

The present invention relates to a fluid control valve, and more particularly, to a fluid control valve which can be suitably used in a hydrogen gas supply system for supplying hydrogen gas to a fuel cell in a fuel cell electric vehicle.

2. Description of the Related Art

Typical fuel injection valves for supplying fuel to an internal combustion engine are designed such that a fuel injection nozzle is closed or opened by movement of a movable valve disposed within a valve body. The movable valve moves by a biasing force generated by a spring and by an electromagnetic force generated by energization of a coil. The valve body comprises a body, a core, a valve seat, which are fitted together. Rubber O-rings are provided in each of the joints of the body, the core, the valve seat. A fluid control valve using a sealing structure having such rubber O-rings is disclosed in WO2003-42526 and Japanese laid-open patent publication No. 9-310656.

Recently, fuel cell electric vehicles with a fuel-cell-power generation system have been developed. The fuel cell power generation system includes a fuel cell that generates power by electrochemical reaction between hydrogen and oxygen, an oxygen supply device that supplies oxygen to the fuel cell, and a hydrogen supply device that supplies hydrogen to the fuel cell. The fuel cell electric vehicle is driven by a driving motor which is supplied with electric power generated by the fuel cell.

A typical hydrogen supply system used in a fuel cell electric vehicle includes a hydrogen storage container for storing hydrogen, a cut-off valve and a regulator which are disposed between the hydrogen storage container and the fuel cell. The regulator reduces the pressure of hydrogen gas supplied from the hydrogen storage container, to a set pressure. As the regulator, for example, a mechanical fluid control valve is used which reduces the pressure of inputted hydrogen gas to a set pressure which is defined by the biasing force of a spring. The cutoff valve is opened when the ignition switch is turned on, while it is closed when the ignition switch is turned off. Hydrogen gas in the hydrogen storage container is supplied to the fuel cell via the regulator when the cutoff valve is opened, while the supply of hydrogen gas to the fuel cell is stopped when the cutoff valve is closed.

SUMMARY OF THE INVENTION

If a sealing structure having a rubber O-ring is used as a sealing structure of a fluid control valve included in a hydrogen supply system, hydrogen gas may permeate the rubber O-ring and leak to the outside.

Accordingly, it is an object of the present invention to provide a fluid control valve which can be suitably used as a hydrogen supply control valve for supplying hydrogen to a fuel cell in a fuel cell electric vehicle.

One object of the present invention is to prevent fluid, especially hydrogen gas, which flows through a fluid passage within a valve body, from leaking to the outside.

A fluid control valve of this invention includes a valve body having a fluid outlet, a movable valve that is movably disposed with respect to the valve body, a spring that generates a biasing force which moves the movable valve, and a coil that generates an electromagnetic force which moves the movable valve. The valve body consists of a plurality of members, and an impermeable joint is formed between the members. The impermeable joint means a joint through which fluid, especially hydrogen gas can not permeate. In order to form such a joint, suitably, the joining portions of two members may be joined by welding. Or, the joining portions of two members may be joined by fusion. Or, the joining portions of two members may be joined by using an adhesive. At least one joint may be formed between a plurality of members forming the valve body.

Preferably, the valve body includes a body, a core disposed within the body, a valve seat disposed within the body, and a ring disposed between the core and the body. The impermeable joint is formed in the joining portions between the body and the valve seat, between the body and the ring and between the core and the ring.

As a control circuit for supplying power to the coil, a control circuit for controlling power supply to the coil such that fluid to be ejected through the fluid outlet has a pressure in proportion to an inputted signal. In order to have a pressure in proportional to an inputted signal, typically, a power pulse having a duty ratio in proportion to the inputted signal is supplied to the coil.

In order to movably dispose the movable valve with respect to the valve body, the movable valve may be supported in a floating state by an elastically deformable support plate. The support plate has an outer circumferential portion, an inner circumferential portion and a plurality of elastically deformable support portions connected to the outer and inner circumferential portions. The outer circumferential portion is attached (mounted) to the valve body, and the inner circumferential portion is attached to the movable valve. The support portions allow the movable valve to move in the axial direction of the valve body.

The movable valve includes an axial fluid passage formed along the axial direction and radial fluid passages formed along the radial direction between the axial fluid passage and the outer circumferential surface. The support portions and the radial fluid passages may be the same or different in number. Preferably, at least two of the support portions and two of the radial fluid passages may be phase adjusted. The phase adjustment is made such that the movable valve is prevented from being tilted with respect to the axial direction by forces acting upon at least the two support portions when the fluid passes through the radial fluid passages.

Typically, each of the support portions includes an outer radial connection extending radially inward from the outer circumferential portion, an inner radial connection extending radially outward from the inner circumferential portion, and a circumferential connection connected to the inner end of the associated outer radial connection and the outer end of the associated inner radial connection and extending along the circumferential direction. In this case, at least either the outer radial connections or the inner radial connections are phase adjusted to the radial fluid passages.

Alternatively, the support portion may be S-shaped as viewed from the axial direction of the support plate. Typically, the support portion includes an outer radial connection extending radially inward from the outer circumferential portion, an inner radial connection extending radially outward from the inner circumferential portion, and a circumferential connection connected to the inner end of the associated outer radial connection and the outer end of the associated inner radial connection and extending along the circumferential direction. The outer radial connection, the inner radial connection and the circumferential connection are connected together into the form of a letter S (the S-shaped form). The "S-shaped form" may be the "generally S-shaped form". And the "S-shaped form" includes the "inverted S-shaped form".

Alternatively, the support plate may include a plurality of outer slits extending along the circumferential direction on the radially outer side, and a plurality of inner slits extending along the circumferential direction on the radially inner side. The outer slits and the inner slits are alternately arranged along the circumferential direction. Each of the outer slits and the inner slits is configured such that the width of its circumferential ends is larger than the width of its circumferential middle portion. Preferably, each of the outer slits and the inner slits is configured such that its circumferential ends have an arcuate shape having a diameter larger than the width of its circumferential middle portion.

The fluid control valve having the above-mentioned construction can be suitably used as a fluid control valve for supplying hydrogen gas to a fuel cell in a fuel cell electric vehicle.

Another object of the present invention is to prevent unstable movement of the movable valve when the movable valve is supported in a floating state by the elastically deformable support plate.

A fluid control valve of this invention includes a valve body having a fluid outlet, a movable valve that is movably disposed with respect to the valve body, a spring that generates a biasing force which moves the movable valve, and a coil that generates an electromagnetic force which moves the movable valve. In order to movably dispose the movable valve with respect to the valve body, the movable valve is supported in a floating state by the elastically deformable support plate. The support plate has an outer circumferential portion, an inner circumferential portion and a plurality of elastically deformable support portions connected to the outer and inner circumferential portions. The outer circumferential portion is attached to the valve body, and the inner circumferential portion is attached to the movable valve. The support portions allow the movable valve to move in the axial direction of the valve body. The movable valve includes an axial fluid passage formed along the axial direction and radial fluid passages formed along the radial directions between the axial fluid passage and the outer circumferential surface. The support portions and the radial fluid passages may be the same or different in number. Preferably, at least two of the support portions and two of the radial fluid passages may be phase adjusted. The phase adjustment is made such that the movable valve is prevented from being tilted with respect to the axial direction by forces acting upon at least the two support portions when the fluid passes through the radial fluid passages. Preferably, the adjacent support portions may share the associated outer radial connection which connects the support portion to the outer circumferential potion or the associated inner radial connection which connects the support portion to the inner circumferential portion. The same numbers of the radial fluid passages and the radial connections (the outer radial connections and the inner radial connections) may be provided, and the radial connections may be phase adjusted to the radial fluid passages.

Another object of the present invention is to prevent stress from concentrating upon the support plate when the movable valve is supported in a floating state by the elastically deformable support plate.

A fluid control valve of this invention includes a valve body having a fluid outlet, a movable valve that is movably disposed with respect to the valve body, a spring that generates a biasing force which moves the movable valve, and a coil that generates an electromagnetic force which moves the movable valve. In order to movably dispose the movable valve with respect to the valve body, the movable valve is supported in a floating state by the elastically deformable support plate. The support plate has an outer circumferential portion, an inner circumferential portion and a plurality of elastically deformable support portions connected to the outer and inner circumferential portions. The outer circumferential portion is attached to the valve body, and the inner circumferential portion is attached to the movable body. The support portions allow the movable valve to move in the axial direction of the valve body.

In one aspect of the present invention which is provided to achieve this object, the support portions are S-shaped as viewed from the axial direction of the support plate. Typically, the support portion includes an outer radial connection extending radially inward from the outer circumferential portion, an inner radial connection extending radially outward from the inner circumferential portion, and a circumferential connection connected to the inner end of the associated outer radial connection and the outer end of the associated inner radial connection and extending along the circumferential direction. The support portion is formed into the form of a letter S (the S-shaped form) by connecting the outer radial connection, the inner radial connection and the circumferential connection. The "S-shaped form" may be the "generally S-shaped form". And the "S-shaped form" includes the "inverted S-shaped form". Preferably, one of the adjacent support portions is S-shaped, and the other is inverted S-shaped. Further, preferably, the adjacent support portions may share the associated outer radial connection which connects the support portion to the outer circumferential potion or the associated inner radial connection which connects the support portion to the inner circumferential portion.

In another aspect of the present invention which is provided to achieve this object, the support plate may include a plurality of outer slits extending along the circumferential direction on the radially outer side, and a plurality of inner slits extending along the circumferential direction on the radially inner side. The outer slits and the inner slits are alternately arranged along the circumferential direction. Each of the outer slits and the inner slits is configured such that the width of its circumferential ends is larger than the width of its circumferential middle portion. Preferably, each of the outer slits and the inner slits is configured such that its circumferential ends have an arcuate shape having a diameter larger than the width of its circumferential middle portion.

A further different object of the present invention is to provide a technique for controlling the fluid control valve which can properly supply hydrogen gas to a fuel cell in a fuel cell electric vehicle.

A fluid control valve of this invention includes a valve body having a fluid outlet, a movable valve that is movably disposed with respect to the valve body, a spring that generates a biasing force which moves the movable valve, and a coil that generates an electromagnetic force which moves the movable valve. Further, a control circuit for controlling power supply to the coil is provided such that fluid to be ejected through the fluid outlet has a pressure in proportion to an inputted signal. The control circuit determines the duty ratio in proportion to the amount of depression of the accelerator pedal, based, for example, on the output characteristic of the fuel cell, which is shown in relations of the pressure of hydrogen gas with respect to the output (generated energy) of the fuel cell, the output characteristic of the fluid control valve, which is shown in relations of the flow rate of hydrogen gas with respect to the pressure of hydrogen gas, the control characteristic of the fluid control valve, which is shown in relations of the duty ratio of the power pulse to be supplied to the coil with respect to the flow rate of hydrogen gas, and the power consumption corresponding to the amount of depression of the accelerator pedal. The control circuit then supplies the power pulse having the determined duty ratio to the coil. The duty ratio corresponding to the amount of depression of the accelerator pedal may be determined by reading the data relating to the duty ratio from the storage circuit, or by calculating the duty ratio in each case.

Other objects, features and advantages of the present invention will be readily understood after reading the following detailed description together with the accompanying drawings and the claims.

DETAILED DESCRIPTION OF THE INVENTION

Figure 1:
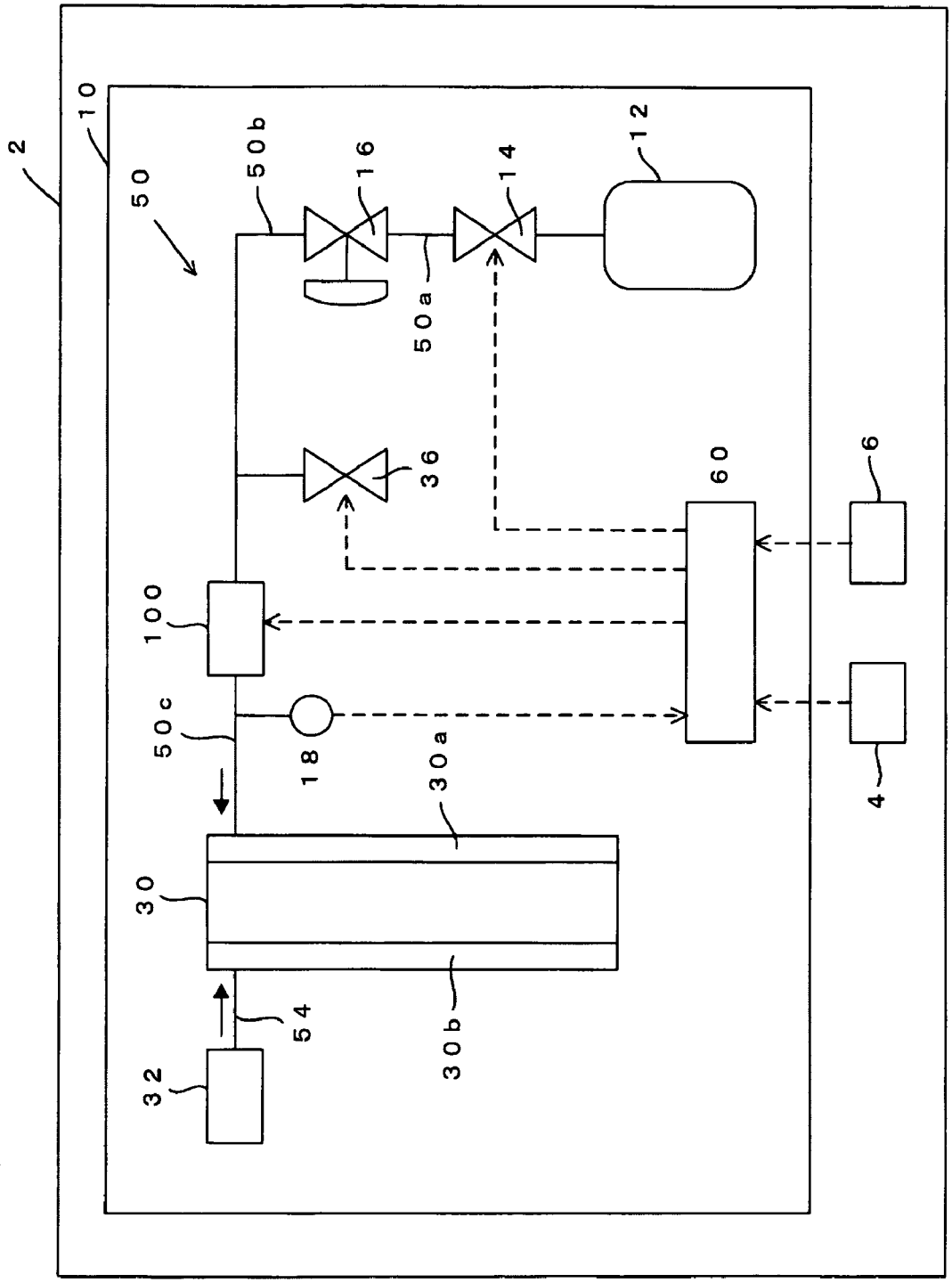
FIG. 1 is a schematic diagram showing the construction of a fuel cell power generation system of a fuel cell electric vehicle.

If a fluid control valve provided with a sealing structure having a rubber O-ring is used as a fluid control valve for supplying hydrogen gas to a fuel cell in a fuel cell electric vehicle, hydrogen gas may permeate the O-ring and leak to the outside. According to the present invention, a valve body has a fluid outlet and a movable valve is movably disposed with respect to the valve body. The valve body consists of a plurality of members, and an impermeable joint is formed between the members. The impermeable joint is formed by adhesion or fusion, or suitably by welding. The impermeable joint may be formed between at least two of the members forming the valve body. The impermeable joint can prevent hydrogen gas from leaking to the outside. Further, a space for mounting an O-ring is not needed, so that the movable valve can have an increased diameter. Thus, the fluid supplying capability can be enhanced.

As a control circuit for generating an electromagnetic force to move the movable valve, a control circuit for supplying a power pulse having a duty ratio in proportion to the inputted signal such that fluid to be ejected through the fluid outlet has a pressure in proportion to an inputted signal may be used. By using such a control circuit, the pressure of the fluid can be controlled in proportion to the inputted signals, such as the amount of depression of the accelerator pedal. Thus, hydrogen gas can be properly supplied to the fuel cell.

The movable valve can be supported in a floating state by an elastically deformable support plate. The support plate has an outer circumferential portion, an inner circumferential portion and a plurality of elastically deformable support portions connected to the outer and inner circumferential portions. The outer circumferential portion is attached to the valve body, and the inner circumferential portion is attached to the movable valve. The support portions allow the movable valve to move in the axial direction of the valve body.

The movable valve typically includes an axial fluid passage formed along the axial direction and radial fluid passages formed along the radial directions between the axial fluid passage and the outer circumferential surface. Forces act upon the support portions of the support plate when the fluid passes through the radial fluid passages. If the forces unevenly act upon the support portions, the movable valve will be tilted with respect to the axial direction. This causes unstable movement of the movable valve. Therefore, it is preferable to phase adjust the support portions and the radial fluid passages. Preferably, each of the support portions includes an outer radial connection extending radially inward from the outer circumferential portion, an inner radial connection extending radially outward from the inner circumferential portion, and a circumferential connection connected to the inner end of the associated outer radial connection and the outer end of the associated inner radial connection and extending along the circumferential direction. In this case, at least either the outer radial connections or the inner radial connections are phase adjusted to the radial fluid passages. The phase adjustment between the radial connections (the outer radial connections and/or the inner radial connections) and the radial fluid passages is preferably made by positioning the radial connections so as to face the radial fluid passages. The numbers of the radial fluid passages and the support portions (the radial connections) can be appropriately selected.

When the movable valve is supported in a floating state by a support plate having support portions, each of the support portions may be S-shaped (form of a letter S) as viewed from the axial direction of the support plate. The S-shaped form may be the generally S-shaped form. And the S-shaped form includes the inverted S-shaped form. With this configuration, the elastic property of the support portions can be effectively utilized. Particularly, one of the adjacent support portions may be S-shaped, while the other may be inverted S-shaped, and the outer radial connection and the inner radial connection of the adjacent support portion may be shared. With this configuration, the elastic property of the support portions can be more effectively utilized.

When the movable valve is supported in a floating state by a support plate having support portions, the support plate may have a plurality of slits formed along the circumferential direction. For example, a plurality of outer slits extend along the circumferential direction on the radially outer side, and a plurality of inner slits extend along the circumferential direction on the radially inner side. The outer slits and the inner slits are alternately arranged along the circumferential direction. Preferably, each of the outer slits and the inner slits is configured such that the width of its circumferential ends is larger than the width of its circumferential middle portion. Suitably, each of the outer slits and the inner slits is configured such that its circumferential ends have an arcuate shape having a diameter larger than the width of its circumferential middle portion. With this configuration, stress can be prevented from concentrating upon the radial connections (the outer radial connections and the inner radial connections)

when the support portions of the support plate are elastically deformed by movement of the movable valve.

Each of the features above mentioned may be utilized separately or in conjunction with other features to provide improved fluid control valve.

Representative examples of the present invention will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and methods disclosed within the following detailed description may not be necessary to practice the invention in the broadest sense.

FIG. 1 diagrammatically shows a fuel cell electric vehicle equipped with a fuel cell power generation system.

A fuel cell electric vehicle 2 includes an ignition switch 4, an accelerator pedal 6, and a fuel cell power generation system 10.

An operating-state detection circuit (not shown) is provided in the ignition switch 4 and outputs operating-state detection signals indicating the operating state of the ignition switch 4. The operating-state detection circuit outputs, for example, an operating-state detection signal for indicating that the ignition switch 4 is turned on or an operating-state detection signal for indicating that the ignition switch 4 is turned off. Further, a depression amount detecting circuit (not shown) is provided in the accelerator pedal 6 and outputs depression amount detection signals. The operating-state detection signal and the depression amount detection signal are inputted into a control circuit 60 of the fuel cell power generation system 10.

The fuel cell electric vehicle 2 is driven by a driving motor (not shown) supplied with electric power which is generated by the fuel cell power generation system 10.

The fuel cell power generation system 10 includes a fuel cell 30, a hydrogen supply device that supplies hydrogen to the fuel cell 30, an oxygen supply device 32 that supplies oxygen to the fuel cell 30, and a control circuit 60. The hydrogen supply device includes a hydrogen storage container (hydrogen tank) 12 for storing hydrogen, a cut-off valve 14 disposed in a gas passage 50 between the hydrogen storage container 12 and the fuel cell 30, a first regulator 16 and a second regulator 100. The hydrogen storage container 12 is capable of storing extra-high pressure hydrogen gas, for example, of 70 MPa at the maximum.

The cut-off valve 14 comprises a cut-off valve for opening and closing a gas outlet of the hydrogen storage container 12 and an excess flow valve disposed downstream of the cutoff valve. The cutoff valve 14 is connected to the first regulator 16 via a gas piping 50a.

The first regulator 16 reduces the pressure of inputted hydrogen gas to approximately 1 MPa. The first regulator 16 is connected to the gas piping 50b. The gas piping 50a is bifurcated into one connected to the second regulator 100 and the other connected to an exhaust valve 36. The second regulator 100 reduces the pressure of inputted hydrogen gas to approximately 0.2 MPa.

When the exhaust valve 36 is opened, hydrogen gas in the gas passage 50 is discharged into the air. A diluter (not shown) is connected to the exhaust valve 36, so that the hydrogen gas is discharged into the air after diluted. Further, a non-return valve (not shown) to prevent the air from entering the gas passage 50 is connected to the exhaust valve 36.

The second regulator 100 is connected to the fuel cell 30 via a gas piping 50c. A pressure sensor 18 is disposed in the gas piping 50c and detects the pressure (injection pressure) of the hydrogen gas supplied from the second regulator 100.

Further, an air supply device 32 is connected to the fuel cell 30 via an air piping 54. The air supply device 32 includes a compressor and a humidifier, and supplies air to the fuel cell 30.

The fuel cell 30 has a hydrogen gas passage 30a and an air passage 30b. Hydrogen gas from the gas piping 50c flows into the hydrogen gas passage 30a, and air from the air piping 54 flows into the air passage 30b. The fuel cell 30 generates power by causing electrochemical reaction between the hydrogen gas introduced into the hydrogen gas passage 30a and the oxygen gas in the air introduced into the air passage 30b.

The control circuit 60 comprises a processing circuit, such as a CPU. The control circuit 60 controls the cutoff valve 14, the second regulator 100 and the exhaust valve 36, based on the pressure detection signals outputted from the pressure sensor 18, the operating-state detection signals indicating that the ignition switch 4 is turned on or turned off, and the depression amount detection signals indicating the amount of depression of the accelerator pedal 6.

For example, the control circuit 60 opens the cut-off valve 14 when the ignition switch 4 is turned on. As a result, the hydrogen gas stored in the hydrogen storage container 12 is supplied into the second regulator 100 via the cut-off valve 14 and the first regulator 16. Then the control circuit 60 controls the power to be supplied to a coil 113 (see FIG. 2) of the second regulator 100, based on the detected amount of depression of the accelerator pedal 6 and the detected pressure of the hydrogen gas supplied from the second regulator 100. In this embodiment, as a method to control the power to be supplied to the coil 113 of the second regulator 100, a method of controlling the duty ratio of the power pulse to be supplied to the coil 113 is used. The duty ratio control method is a method of controlling the duty ratio ($=t/T\times 100\%$) which is the ratio of the period T of the power pulse to the width t (ON time) of the power pulse. The construction and the controlling method of the second regulator 100 will be described below.

The control circuit 60 closes the cut-off valve 14 and opens the exhaust valve 36 when the ignition switch 4 is turned off. As a result, supply of hydrogen gas from the hydrogen storage container 12 is stopped and hydrogen gas in the gas passage 50 is discharged into the air. The exhaust valve 36 needs to be closed at least before the cut-off valve 14 is opened again.

In the fuel cell power generation system 10 shown in FIG. 1, a fluid control valve according to this invention is used as the second regulator 100. The second regulator 100 will be referred to as the "fluid control valve 100" in the following description.

Figure 2:
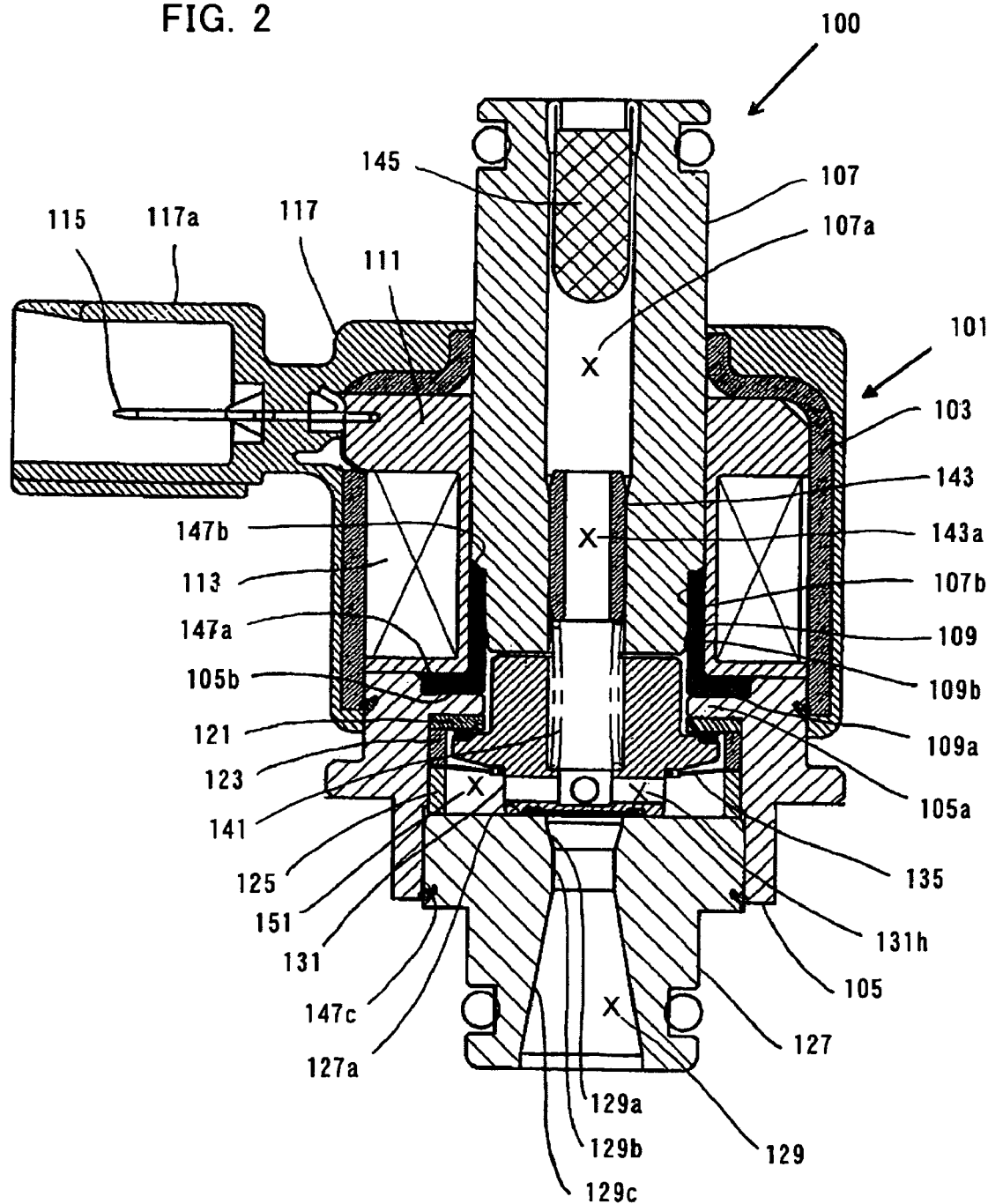
FIG. 2 is a sectional view showing an entire fluid control valve according to an embodiment of the present invention.

The construction of the fluid control valve 100 will now be described with reference to FIGS. 2 to 5. In FIG. 2, hydrogen gas flows from top to bottom. In the following description, the upstream side with respect to the direction of flow of the hydrogen gas (the top side in FIG. 2) will be referred to as the "upstream side", and the downstream side with respect to the direction of flow of the hydrogen gas (the bottom side in FIG. 2) will be referred to as the "downstream side".

As shown in FIG. 2, the fluid control valve 100 of this embodiment includes a body 101. The body 101 is formed of a magnetic material and has a generally cylindrical shape. The body 101 includes an upper body 103 and a lower body 105. The lower body 105 is fitted into the downstream side portion of the upper body 103. A generally cylindrical core 107 is inserted into the center of the upper body 103. The core 107 comprises a magnetic material.

A valve seat 127 is fitted into the downstream side portion of the lower body 105. The valve seat 127 is formed of a nonmagnetic material or nonmagnetic damping alloy. A sealing surface 127a is formed in the upstream-side end surface of the valve seat 127. A gas injection nozzle 129 is formed through the axial center of the valve seat 127. The gas injection nozzle 129 includes a tapered portion 129a, a uniform-diameter portion 129b and an expanding portion 129c in this order from the upstream side to the down stream side.

Hydrogen gas corresponds to the "fluid" in this invention. The gas injection nozzle 129 corresponds to the "fluid outlet" in this invention.

The valve seat 127 and the lower body 103 are joined by welding. In this embodiment, the outer circumferential surface of the valve seat 127 is welded to the inner circumferential surface of the lower body 105 along the circumferential direction at a location of the downstream end surface of the lower body 105. Thus, an impermeable joint 147c is formed in the joining portion between the valve seat 127 and the lower body 105.

The "impermeable joint" refers to a sealed portion that can prevent fluid, such as hydrogen gas, from leaking out from a gas passage (fluid passage) by permeation.

A ring 109 is formed of a non-magnetic material and disposed between the core 107 and the lower body 105.

The ring 105 includes a generally cylindrical ring portion 109b and a flange portion 109a protruding radially outward from the downstream end of the ring portion 109b. A small-diameter stepped portion 107b is formed in the downstream-side periphery of the core 107. Further, an annular recessed stepped portion 105b is formed in the inner circumferential portion of the upstream end surface of the lower body 105.

The flange portion 109a of the ring 109 is fitted in the recessed stepped portion 105b of the lower body 105. Then the flange portion 109a is welded to the lower body 105. In this embodiment, the outer circumferential end surface of the flange portion 109a is welded to the radially inner end surface of the recessed stepped portion 105b of the lower body 105 along the circumferential direction at a location of the upstream end surface of the lower body 105. Thus, an impermeable joint 147a is formed in the joining portion between the ring 109 and the lower body 105 by welding.

The ring portion 109b of the ring 109 is fitted in the small-diameter stepped portion 107b of the core 107 such that the upstream end surface of the ring portion 109b is in contact with the axial end surface of the small-diameter stepped portion 107b. Then the ring portion 109b is welded to the core 107. In this embodiment, the upstream end surface of the ring portion 109b is welded to the axial end surface of the small-diameter stepped portion 107b of the core 107 along the circumferential direction at a location of the outer circumferential surface of the core 107. Thus, an impermeable joint 147b is formed in the joining portion between the ring 109 and the core 107 by welding.

In this embodiment, further the inner circumferential surface of the upper body 103 is welded to the outer circumferential surface of the lower body 105. This welding is intended to join the upper body 103 and the lower body 105, but not to form a joint for preventing leakage of hydrogen gas.

The upper body 103, the lower body 105, the core 107, the valve seat 127 and the ring 109 form the "valve body" according to this invention.

The joints 147a, 147b, 147c formed by welding correspond to the "impermeable joints" according to this invention.

A bobbin 111 is disposed between the upper body 103 and the core 107. The bobbin 111 is generally cylindrically formed of an electrical insulating material, such as synthetic resin. A coil (solenoid coil) is wound on the bobbin 111. A terminal 115 is connected to the coil 113. A housing 117 is formed on the upper body 103 and has a socket 117a surrounding the terminal 115. A connector connected to a power source is inserted into the socket 117a. The control circuit 60 controls the power supply to the coil 113. When power is supplied to the coil 113, magnetic flux flows via the upper body 103, the core 107, the movable valve 131 and the lower body 105. As a result, an electromagnetic force is generated and moves the movable valve 131 in a direction that closes the gas injection nozzle 129.

The coil 113 corresponds to the "electromagnetic force generating member" of this invention.

A stopper 121, a collar 123, a support plate 135 for supporting the movable valve 131, a ring 125 and the valve seat 127 are disposed inside the lower body 105 in this order.

The stopper 121 is formed, for example, of a magnetic material and has a ring-like shape. The stopper 121 is fitted in the inside of the lower body 105 in contact with an inner flange 105a of the lower body 105.

The collar 123 is formed, foe example, of a stainless steel material and has a ring-like shape. The collar 123 is fitted in the inside of the lower body 105 in contact with the stopper 121.

The support plate 135 supports the movable valve 131 such that the movable valve 131 can move in a direction (downward as viewed in FIG. 2) that closes the gas injection nozzle 129 (hereinafter referred to as a "closing direction") and in a direction (upward as viewed in FIG. 2) that opens the gas injection nozzle 129 (hereinafter referred to as "opening direction"). The support plate 135 comprises a spring sheet, for example, formed of precipitation hardening stainless steel. The support plate 135 has a disc-like shape. The support plate 135 is fitted in the inside of the lower body 105 in such a manner that its outer circumferential portion contacts the collar 123.

The ring 125 is formed, for example, of a stainless steel material and has a ring-like shape. The ring 125 is fitted in the inside of the lower body 105 in contact with the outer circumferential portion of the support plate 135.

The valve seat 127 is fitted in the inside of the lower body 105 in contact with the ring 125. Further, the outer circumferential surface of the valve seat 127 is welded to the inner circumferential surface of the lower body 105. As a result, the stopper 121, the collar 123, the outer circumferential portion of the support plate 135 and the ring 125 are fixedly held between the inner flange 105a of the lower body 105 and the valve seat 127. In this state, the outer circumferential portion of the support plate 135 is sandwiched between the collar 123 and the ring 125.

Figure 4:
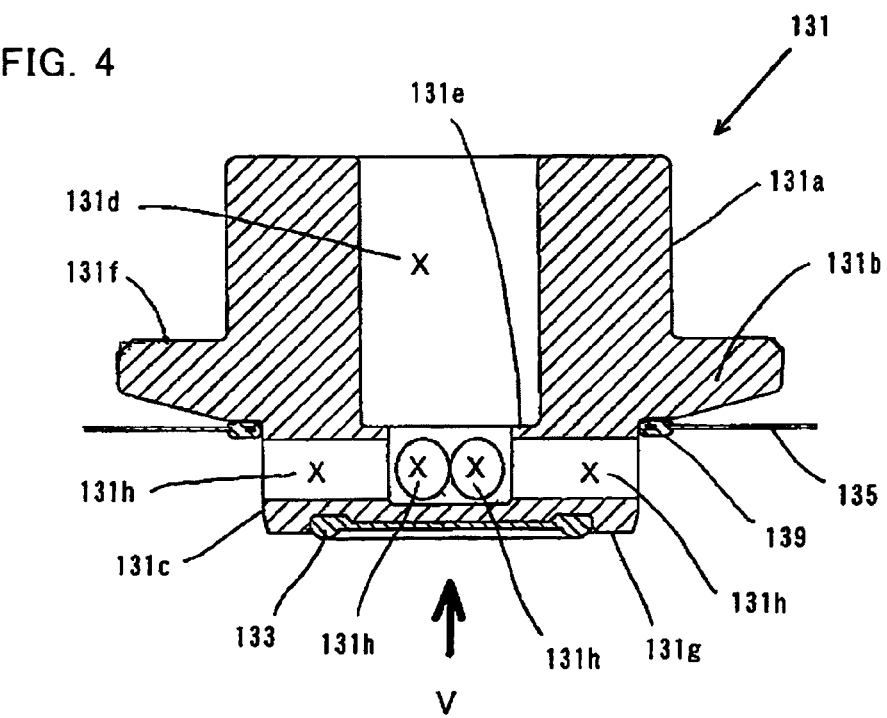
FIG. 4 is a sectional view showing a movable valve and the support plate.

The movable valve 131 is formed of a magnetic material, for example, electromagnetic stainless steel material. As shown in FIG. 4, the movable valve 131 includes a cylindrical body 131a, a flange 131b extending outward from the body 131a, and a tip end portion 131c. The tip end portion 131c has a circular section perpendicular to its axial direction. The body 131a and the flange 131b serve as an armature through which magnetic flux flows.

A stepped portion 131e is formed in a hollow portion 131d of the body 131a. The hollow portion 131d of the body 131a is used as an axial gas passage 131d. Further, a contact surface 131f that can contact the stopper 121 is formed on the upstream side (the upper side as viewed in FIG. 4) of the flange 131b.

The tip end portion 131c has a contact surface 131g on the downstream side (the lower side as viewed in FIG. 4) which can contact a sealing surface 127a of the valve seat 127.

Further, a circular recess is formed in the contact surface 131g, and a circular elastic element 133 is fitted in the circular recess. A protrusion having a ring-like shape is formed on the downstream side (the side facing the sealing surface 127a) of the elastic element 133. The protrusion protrudes downstream from the contact surface 131g. The elastic element 133 is formed, for example, of rubber.

Thus, when the movable valve 131 moves in the closing direction, first, the protrusion of the elastic element 133 contacts the sealing surface 127a of the valve seat 127 and then elastically deforms. The contact surface 131g then contacts the sealing surface 127a of the valve seat 127, so that the movable valve 131 stops moving. In this state, the gas injection nozzle 129 is closed. As a result, a higher sealing performance is obtained, and early deterioration of the elastic element 133 can be prevented.

Further, a plurality of radial gas passages 131h are formed through the tip end portion 131c. The radial gas passages 131h extend radially from the axial gas passage 131d of the body 131a to the outer surface of the tip end portion 131c. In this embodiment, six radial gas passages 131h radiate from the axial gas passage 131d and are spaced equidistantly (with a spacing of 60°) in the circumferential direction. The axial gas passage 131d and the radial gas passages 131h form a gas passage of the movable valve 131.

The axial gas passage 131d and the radial gas passages 131h are correspond to the "fluid passage" of this invention.

Figure 3:
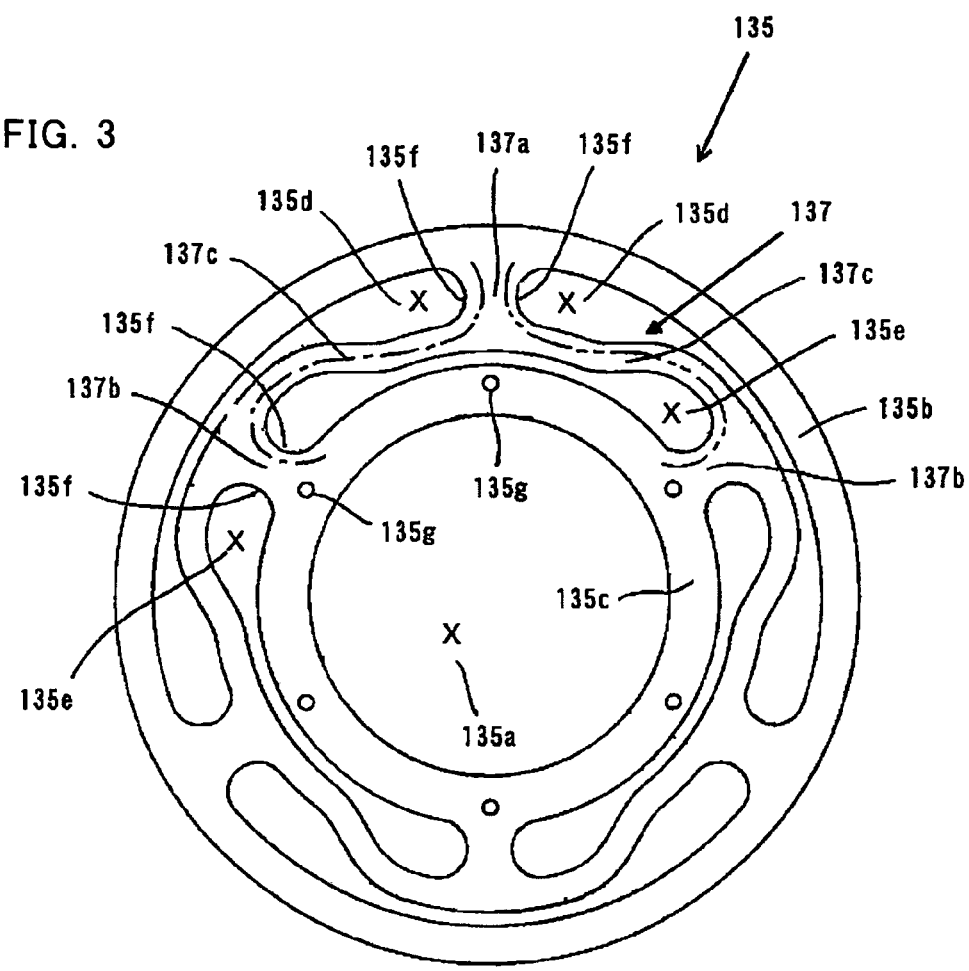
FIG. 3 is a front view of a support plate.

Next, the support plate 135 for supporting the movable valve 131 will be explained. FIG. 3 shows the entire support plate 135 formed of a spring sheet.

The support plate 135 is formed, for example, of precipitation hardening stainless steel. The support plate 135 has a disc-like shape having a circular hole 135a in the center. The support plate 135 has an outer circumferential portion 135b along the circumferential direction on the radial outside, an inner circumferential portion 135c along the circumferential direction on the radial inside and elastically deformable support portions 137 connected to the outer circumferential portion 135b and the inner circumferential portion 135c. Each of the support portions 137 has an outer radial connection 137a, an inner radial connection 137b and a circumferential connection 137c.

Each of the outer radial connections 137a extends radially inward from the outer circumferential portion 135b. In this embodiment, three outer radial connections 137a are spaced equidistantly (with a spacing of 120°) in the circumferential direction. Each of the inner radial connections 137b extends radially outward from the inner circumferential portion 135c. In this embodiment, three inner radial connections 137b are spaced equidistantly (with a spacing of 120°) in the circumferential direction. A phase difference of 60° is provided in the circumferential direction between the outer radial connections 137a and the inner radial connections 137b. Each of circumferential connections 137c is connected to the inner end of the associated outer radial connection 137a and the outer end of the associated inner radial connection 137b and extends along the circumferential direction. The adjacent support portions 137 share the associated outer radial connection 137a or the associated inner radial connection 137b.

Thus, the three outer radial connections 137a and the three inner radial connections 137b are alternately arranged with a spacing of 60° along the circumferential direction. The six circumferential connections 137c extend along the circumferential direction between the associated outer radial connection 137a and the associated inner radial connection 137b respectively.

The support plate 135 has outer slits 135d and inner slits 135e defined by the outer circumferential portion 135b, the inner circumferential portion 135c, the outer radial connections 137a, the inner radial connections 137b and the circumferential connections 137c.

In this embodiment, three outer slits 135d are formed along the circumferential direction between the outer radial connections 137a and three inner slits 135e are formed along the circumferential direction between the inner radial connections 137b. Specifically, the three outer slits 135d and the three inner slits 135e are formed equidistantly (with a spacing of 120°) in the circumferential direction. The three outer slits 135d and the three inner slits 137e are alternately arranged with a phase difference of 60° along the circumferential direction.

Further, each of the outer slits 135d is configured such that the width of its circumferential ends (adjacent to the outer radial connections 137a) is larger than the width of its circumferential middle portion (adjacent to the inner radial connection 137b). In this embodiment, each of the circumferential ends of the outer slits 135d has an arcuate shape having a diameter larger than the width of its circumferential middle portion. Similarly, each of the inner slits 135e is configured such that the width of its circumferential ends (adjacent to the inner radial connections 137b) is larger than the width of its circumferential middle portion (adjacent to the outer radial connection 137a). In this embodiment, each of the circumferential ends of the inner slits 135e has an arcuate shape having a diameter larger than the width of its circumferential middle portion.

In the support plate 135 thus constructed, an elastically deformable support portion 137 is provided in the middle region between the outer circumferential portion 135b and the inner circumferential portion 135c and serves to support the inner circumferential portion 135c such that the inner circumferential portion 135c can move with respect to the outer circumferential portion 135b in the axial direction (in the vertical direction as viewed in FIG. 2). The support portion 137 includes the outer radial connection 137a, the inner radial connection 137b and the circumferential connection 137c that connects the adjacent pair of the outer and inner radial connections 137a, 137b. The outer radial connections 137a and the inner radial connections 137b can be referred to as "pillar member", and the circumferential connections 137c can be referred as "beam member".

The support portion 137 is S-shaped as viewed from the axial direction of the support plate 135. The S-shaped form may be the generally S-shaped form. And the S-shaped form includes the inverted S-shaped form. In this embodiment, the outer radial connections 137a and the inner radial connections 137b are alternately arranged along the circumferential direction, and the circumferential connections 137c connect the adjacent pair of the outer and inner radial connections 137a, 137b, and the adjacent support portions 137 share the associated outer radial connection 137a or the associated inner radial connection 137b. Thus, in this embodiment, S-shaped support portions 137 (dashed double-dotted line shown in FIG. 3) and the inverted S-shaped support portions 137 (dashed dotted line shown in FIG. 3) are alternately formed.

An elastic element 139 is provided on the inner circumferential portion 135c of the support plate 135 in such a manner as to cover the inner circumferential portion 135c (see FIG. 4). The elastic element 139 is formed, for example, of rubber and mounted to the inner circumferential portion 135c of the support plate 135, for example, by insert molding.

Six holes 135g are equidistantly formed through the inner circumferential portion 135c of the support plate 135. Thus, portions of the elastic element 139 on the front and rear sides of the inner circumferential portion 135c are connected to each other via the holes 135g.

The inside diameter of the elastic element 139 is slightly smaller than the outside diameter of the body 131a of the movable valve 131. Thus, the movable valve 131 is attached (mounted) to the support plate 135 by interference fit of the body 131a into the elastic element 139.

Figure 5:
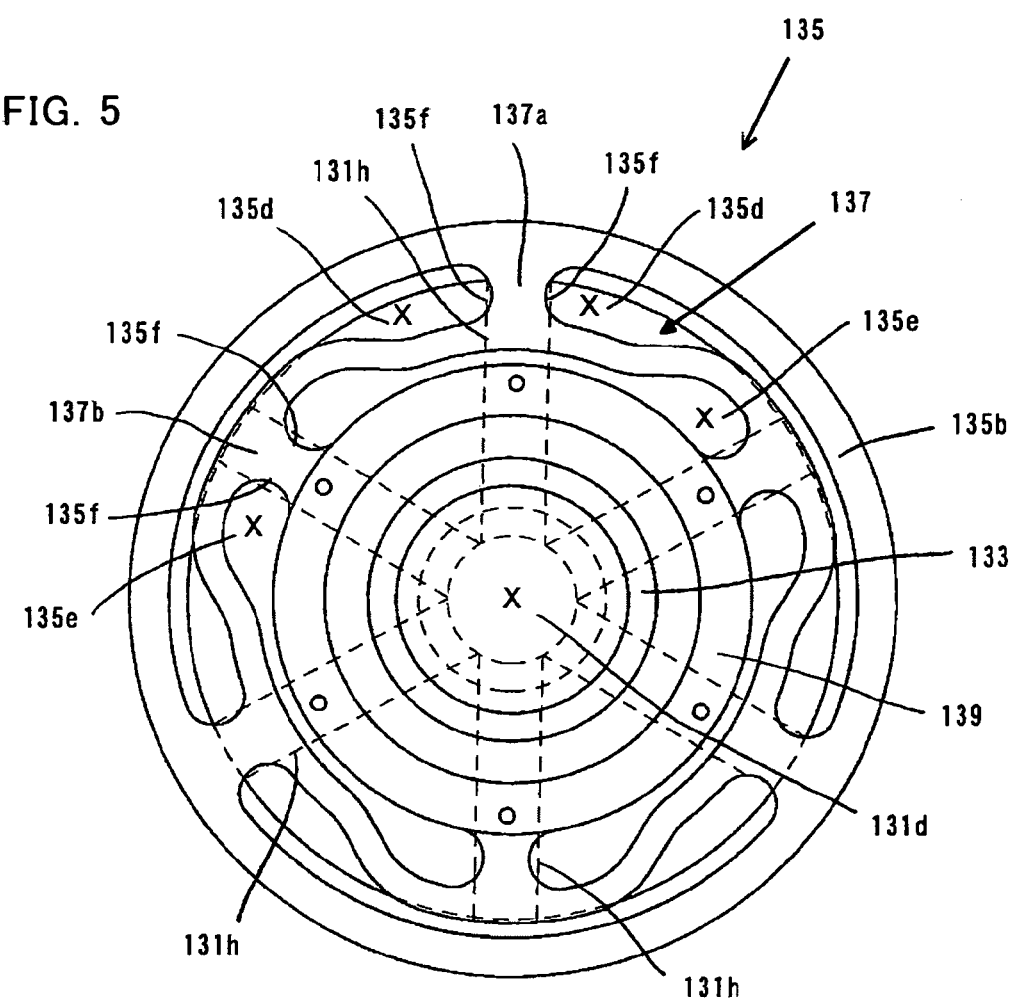
FIG. 5 is a view as viewed from the direction of arrow V in FIG. 4.

At this time, the movable valve 131 is attached to the support plate 135 such that the radial gas passages 131h of the movable valve 131 are phase adjusted to the support portions 137 of the support plate 135. In this embodiment, as shown in FIG. 5, the movable valve 131 is attached to the support plate 135 such that the outer radial connections 137a and the inner radial connections 137b of the support portions 137 face the radial gas passages 131h.

The numbers of the radial gas passages 131h of the movable valve 131 and the radial connections (the outer radial connections 137a and the inner radial connections 137b) of the support plate 135 are not limited to six, but may be, for example, two, three, four, etc. Further, the number of the radial gas passages 131h may be different from the number of the radial connections (the outer radial connections 137a and the inner radial connections 137b). For example, the movable valve 131 may have six radial gas passages 131h and the support plate 135 may have three or two radial connections.

The outer circumferential portion 135b of the support plate 135 is sandwiched between the collar 123 and the ring 125. Further, the movable valve 131 is attached (mounted) to the inner circumferential portion 135c via the elastic element 139. Thus, the movable valve 131 is supported by the support plate 135 in a floating state. More specifically, the movable valve 131 is supported in a state in which the outer circumferential surface of the movable valve 131 is not in contact with the inner circumferential surface of the lower body 135 or other parts. Therefore, when the movable valve 131 moves in the opening or closing direction, the support portion 137 is elastically deformed in the same direction.

A spring adjuster 143 is disposed in the core 107 by press-fitting. A spring 141 is disposed between an end surface of the spring adjuster 143 and a stepped surface 131e of the movable valve 131 which faces the axial gas passage 131d. The biasing force of the spring 141 acts to move the movable valve 131 in the closing direction The biasing force of the spring 141 can be adjusted by changing the amount of press-fitting of the spring adjuster 143. The spring 141 corresponds to the "biasing force generating device" of this invention.

As an alternative method for disposing the spring adjuster 143 in the core 107, a female thread may be formed on the inner surface of the core 107 and a male thread may be formed on the outer surface of the spring adjuster 143, so that the spring adjuster 143 can be screwed into the core 107. In this case, the biasing force of the spring 141 can be adjusted by changing the amount of screwing.

When the movable valve 131 is located in a position (referred to as the "closed position") in which the contact surface 131g of the movable valve 131 is in contact with the sealing surface 127a of the valve seat 127, the biasing force generated by the support plate 135 acts to move the movable valve 131 in the opening direction. As a result, the movable valve 131 is always held in contact with the support plate 135. Because the biasing force generated by the support plate 135 is far smaller than the biasing force generated by the spring 141, it has no influence on movement of the movable valve 131 which is caused by the biasing force of the spring 141.

The movable valve 131 moves in the opening or closing direction by the biasing force of the spring 141 and the electromagnetic force generated by power supply to the coil 113.

In this embodiment, when power is not supplied to the coil 113, the movable valve 131 moves in the closing direction by the biasing force of the spring 141. The protrusion of the elastic element 133 of the movable valve 131 then contacts the sealing surface 127a of the valve seat 127. Subsequently, the contact surface 131g of the movable valve 131 contacts the sealing surface 127a of the valve seat 127 and the movable valve 131 is held in the position (closed position) of contact of the contact surface 131g with the sealing surface 127a. At this state, the gas injection nozzle 129 is closed, and hydrogen gas is not injected through the gas injection nozzle 129.

In this state, when power is supplied to the coil 113, the movable valve 131 moves in the opening direction by the electromagnetic force. Then, the movable valve 131 stops in a position (referred to as the "opened position") in which the contact surface 131f of the flange 131b of the movable valve 131 is in contact with the stopper 121. Further, when the movable valve 131 moves in the opening direction, the contact surface 131g of the movable valve 131 and the protrusion of the elastic element 133 moves away from the sealing surface 127a of the valve seat 127. Thus, the gas injection nozzle 129 is opened. As a result, hydrogen gas is injected via a gas passage 107a of the core 107, a gas passage 143a of the spring adjuster 143, the axial gas passage 131d and the radial gas passages 131h of the movable valve 131, a gas passage 151 and the gas injection nozzle 129.

The movable valve 131 moves in the closing direction by the biasing force of the spring 141 when power supply to the coil 113 stops.

The movable valve 131 for the fluid control valve 100 may have other constructions.

Figure 6:
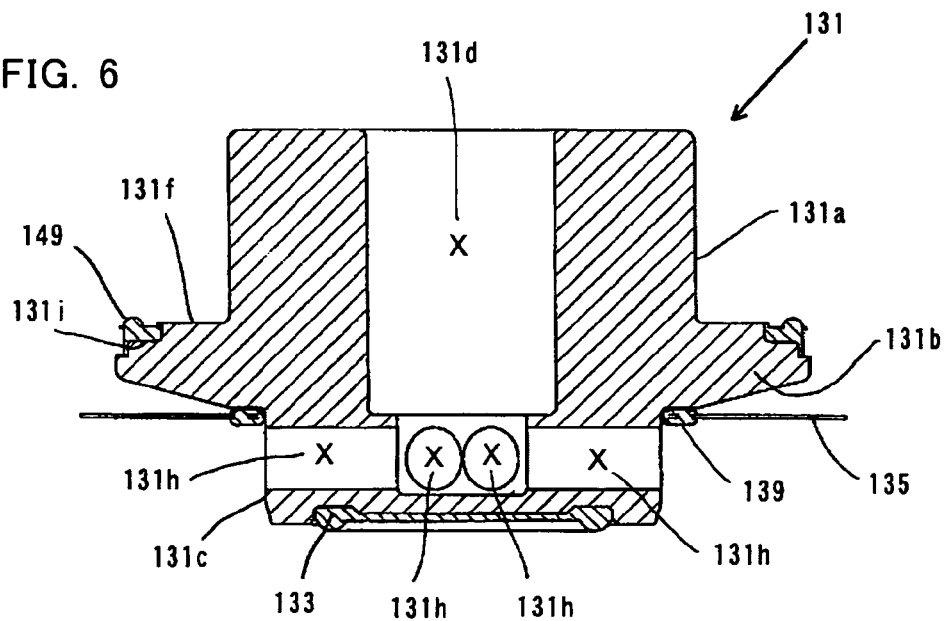
FIG. 6 is a sectional view showing a modified movable valve.
Figure 7:
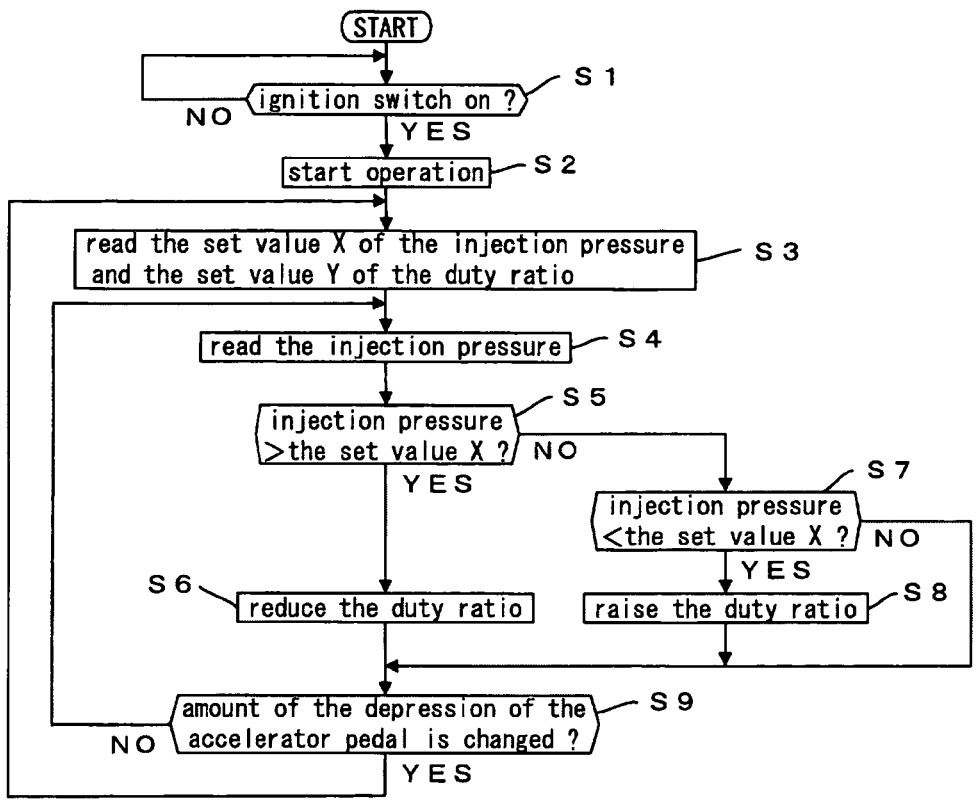
FIG. 7 is a flow chart explaining the operation for controlling the fluid control valve.

FIG. 6 shows a modification of the movable valve 131. The movable valve 131 shown in FIG. 6 has a stepped notch 131i formed in the edge portion of the contact surface 131f of the flange 131b. A generally ring-like elastic element 149 is fitted in the stepped notch 131i. The elastic element 149 is formed, for example, of rubber. This elastic element 149 can cushion an impact force which is caused by contact of the contact surface 131f of the flange 131b of the movable valve 131 with the stopper 121 (see FIG. 2) when the movable valve 131 moves in the opening direction. Therefore, generation of noise can be reduced when the contact surface 131f contacts the stopper 121.

In the fluid control valve thus constructed according to this embodiment, impermeable joints 147a, 147b, 147c are formed by welding the joining portions between the ring 109 and the lower body 105, between the ring 109 and the core 107, and between the valve seat 127 and the lower body 105. Therefore, compared with a prior art fluid control valve which uses a sealing structure having a rubber O-ring, hydrogen gas flowing through the gas passage of the valve body can be more reliably prevented from leaking to the outside. Particularly by forming the joints by welding, when the fluid control valve is used for supplying high-pressure hydrogen gas, strength degradation due to deterioration can be prevented, and durability can be increased.

Further, the prior art fluid control valve which uses a sealing structure having a rubber O-ring requires a space for mounting the O-ring, and thus the movable valve cannot be designed to have a larger diameter. Therefore, the electromagnetic force which acts upon the movable valve is small, so that a sufficient amount of hydrogen gas cannot be supplied to a fuel cell of a fuel cell electric vehicle. In this case, if the diameter of the movable valve is increased in order to supply a sufficient amount of hydrogen gas to the fuel cell, the outside diameter of the valve body for housing the movable valve will be increased.

In the fluid control valve of this embodiment, the impermeable joints 147a, 147b, 147c are formed by welding in order to prevent leakage of hydrogen gas to the outside. Thus, provision of O-rings is not required, and thus, it is not necessary to provide spaces for mounting O-rings on the lower body 105, the valve seat 127 and the ring 109 which form the valve body. Therefore, the movable valve can have a diameter increased by the mounting spaces for the O-rings. The increase of the diameter of the movable valve allows a sufficient supply of hydrogen gas. Thus, a sufficient amount of hydrogen gas can be supplied to a fuel cell of a fuel cell electric vehicle without need of increasing the outside diameter of the valve body.

By the way, when the movable valve 131 is supported in a floating state by the support plate 135, movement of the movable valve 131 may get unstable. For example, when the movable valve 131 moves in the opening direction by the electromagnetic force and the gas injection nozzle 129 opens, hydrogen gas flows through the radial gas passages 131h formed in the movable valve 131. By the flow of hydrogen gas through the radial gas passages 131h, axial and radial forces act upon the movable valve 131. Such forces act upon the support portions 137 of the support plate 135. At this time, if the radial gas passages 131h of the movable valve 131 are not located in a relative positional relationship with (not phase adjusted to) the support portions 137 of the support plate 135, the forces acting upon the support portions 137 of the support plate 135 will vary. In this case, the inner circumferential portion 135c of the support plate 135 will be inclined with respect to the outer circumferential portion 135, so that movement of the movable valve 131 may get unstable.

In the fluid control valve 100 of this embodiment, as shown in FIG. 5, the movable valve 131 and the support plate 135 are arranged such that the radial gas passages 131h are phase adjusted to the support portions 137. Specifically, the support plate 135 and the movable valve 131 are phase adjusted to each other such that the radial connections (the outer radial connections 137a and the inner radial connections 137b) of the support portions 137 face the radial gas passages 131h of the movable valve 131. With this arrangement, the forces that act upon the movable valve 131 by the flow of hydrogen gas through the radial gas passages 131h act almost evenly upon the radial connections (the outer radial connections 137a and the inner radial connections 137b) of the support portions 137. Therefore, the inner circumferential portion 135c of the support plate 135 is held nearly parallel to the outer circumferential portion 135b when it moves. Thus, stable movement of the movable valve 131 can be always ensured. Further, the movable valve 131 linearly moves without being inclined with respect to the axial direction of the support plate 135. Therefore, the amount of injection of hydrogen gas from the gas injection nozzle 129 can be stabilized and the injection performance can be improved. Further, due to the stable movement of the movable valve 131, no force unevenly acts upon part of the support portions 137 Thus, the durability of the support plate 135 can be increased.

The construction in which the support portions 137 of the support plate 135 are phase adjusted to the radial gas passages of the movable valve 131 can be suitably used in a fluid control valve for supplying hydrogen gas. This construction can be applied to a fluid control valve having no impermeable joints in the valve body, such as a fluid control valve having a sealing structure with a rubber O-ring. Further, it can be applied to a fluid control valve for supplying various kinds of fluid, other than hydrogen gas.

When the movable valve 131 is supported in a floating state by the elastically deformable support plate 135, stress may concentrate upon the support portions 137.

In the fluid control valve 100 of this embodiment, the support portions 137 of the support plate 135 are S-shaped as viewed from the axial direction of the support plate 135. Specifically, each of the support portions 137 has the outer radial connection 137a, an inner radial connection 137b and a circumferential connection which connects the inner end of the outer radial connection 137a and the outer end of the inner radial connection 137b. The "S-shaped form" may be "generally S-shaped form". And the "S-shaped form" includes the "inverted S-shaped form". With this configuration, the elastic property of the support portions 137 of support plate 135 can be effectively utilized. Particularly, one of the adjacent support portions 137 is formed into the S-shape, while the other is formed into the inverted S-shape, and the outer radial connection 137a and the inner radial connection 137b of the adjacent support portions are shared. With this configuration, the elastic property of the support portion 137 of the support plate 135 can be more effectively utilized.

In the fluid control valve 100 of this embodiment, the circumferentially extending outer slits 135d and inner slits 135e are defined by the outer circumferential portion 135b, the inner circumferential portion 135c, the outer radial connections 137a, the inner radial connections 137b and the circumferential connections 137c. The outer slits 135d and the inner slits 135e are arranged out of phase with each other along the circumferential direction. Moreover, each of the outer slits 135d and the inner slits 135e has its circumferential ends 135f wider than its circumferential middle portion. With such configuration, stress can be prevented from concentrating upon the radial connections (the outer radial connections 137a and the inner radial connections 137b) when the support portions 137 of the support plate 135 are elastically deformed by movement of the movable valve 131. Such concentration of stress upon the radial connections (the outer radial connections 137a and the inner radial connections 137b) can be further prevented particularly by forming each of the outer slits 135d and the inner slits 135e such that its circumferential ends 135f have an arcuate shape having a diameter larger than the width of its circumferential middle portion. Therefore, the durability of the support plate 135 can be enhanced.

The construction in which each of the outer slits 135d and the inner slits 135e has its circumferential ends 135f wider than its circumferential middle portion and the construction in which each of the outer slits 135d and the inner slits 135e is configured such that its circumferential ends 135f have an arcuate shape having a diameter larger than the width of its circumferential middle portion, can be suitably used in a fluid control valve for supplying hydrogen gas. These constructions can be used in a fluid control valve having no impermeable joints in the valve body, such as a fluid control valve having a sealing structure with a rubber O-ring. Further, it can be used in a fluid control valve for supplying various kinds of fluid, other than hydrogen gas.

In the fluid control valve 100 of this embodiment, the valve seat 127 is made of damping alloys. Such material can cushion the impact which is caused by contact of the contact surface 131g of the movable valve 131 with the sealing surface 127a of the valve seat 127 when the movable valve 131 moves in the closing direction. Therefore, generation of noise can be reduced when the contact surface 131g contacts the sealing surface 127a. Further, rebound of the movable valve 131 can be reduced, so that an appropriate amount of injection of hydrogen gas through the gas injection nozzle 129 can be ensured.

The construction in which the valve seat 127 is made of damping alloys can be suitably used in a fluid control valve for supplying hydrogen gas. This construction can be applied to a fluid control valve having no impermeable joints in the valve body. Further, it can be applied to a fluid control valve for supplying various kinds of fluid, other than hydrogen gas.

Next, a method for controlling the fluid control valve 100 by the control circuit 60 will now be explained.

Figure 11:
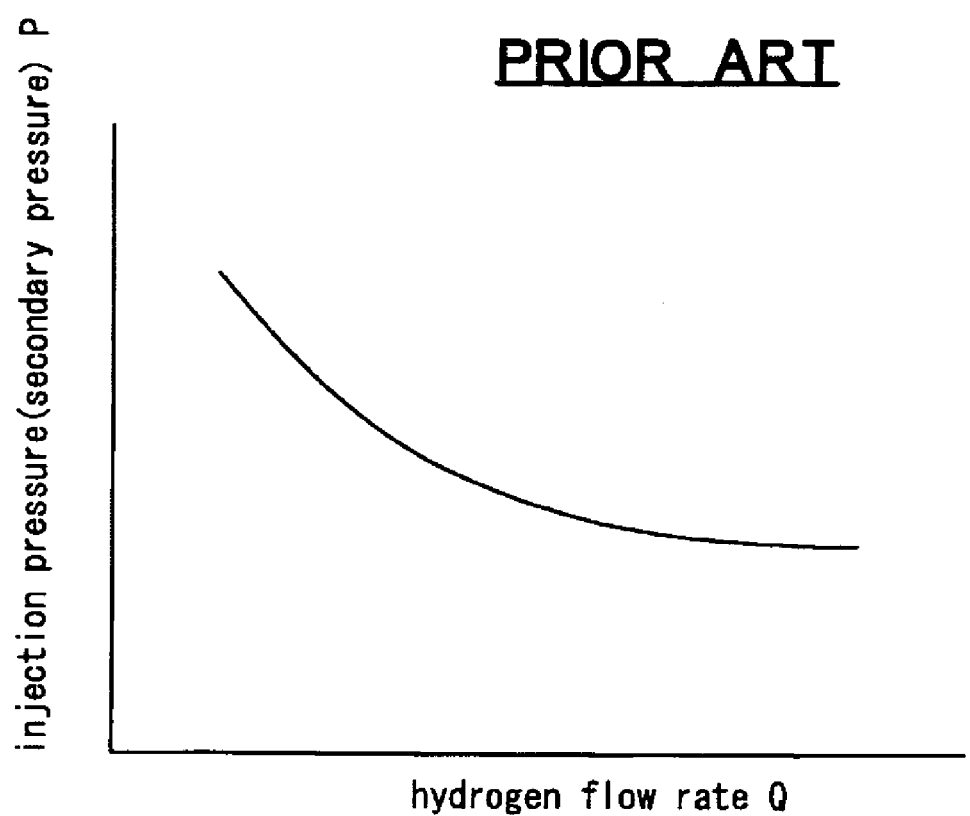
FIG. 11 is a graph showing the relationship between the injection pressure and the hydrogen flow rate in a prior art.

FIG. 11 shows the control characteristic of a known mechanical pressure control valve that reduces the pressure of inputted hydrogen gas to a set pressure which is defined by the biasing force of a spring. In FIG. 11, the control characteristic of the known fluid control valve is shown in relation of the injection pressure (secondary pressure) P with respect to the hydrogen flow rate Q. The "hydrogen flow rate" and the "injection pressure (secondary pressure)" here mean the flow rate and the pressure of hydrogen gas to be injected through the gas injection nozzle 129 of the fluid control valve, respectively.

In a fuel cell electric vehicle, most of the power consumption is consumed by a driving motor. The power consumption of the driving motor is determined according to the amount of depression of the accelerator pedal. Therefore, it is preferable to control the flow rate of hydrogen gas to be supplied to the fuel cell in proportion to the amount of depression of the accelerator pedal. In the known fluid control valve, the flow rate and the pressure of hydrogen gas to be supplied to the fuel cell cannot be properly controlled.

A method of controlling the flow rate of hydrogen gas to be supplied to the fuel cell in proportion to the amount of depression of the accelerator pedal will be explained. In this embodiment, duty rate control is used as the method of controlling the power to be supplied to the coil 113 of the fluid control valve 100. The duty ratio control is the method of controlling the duty ratio (=t/T×100%) of the period T of a power pulse to be supplied to the coil 113 to the width t of the power pulse (ON time).

Figure 8:
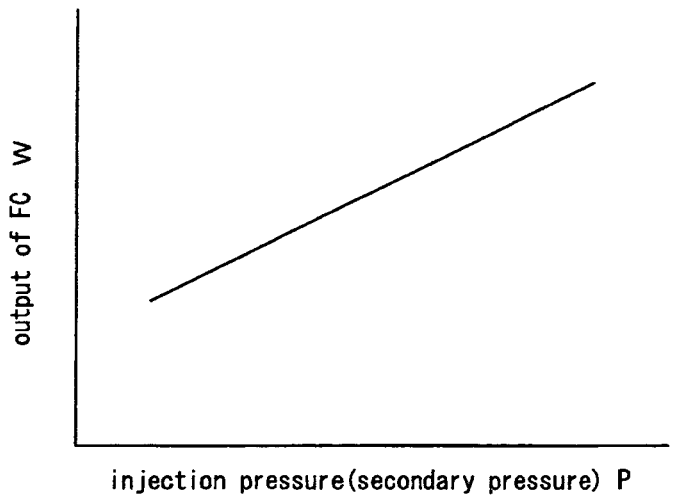
FIG. 8 is a graph showing the relationship between the fuel cell electric vehicle power output and the injection pressure.

FIG. 8 shows the output characteristic of the fuel cell 30. In FIG. 8, the output characteristic is shown in relation of the injection pressure (secondary pressure) P with respect to the output (generated energy) W of the fuel cell 30. The pressure of hydrogen gas required to generate a desired output from the fuel cell 30 can be determined based on the output characteristic of the fuel cell 30 shown in FIG. 8.

Figure 9:
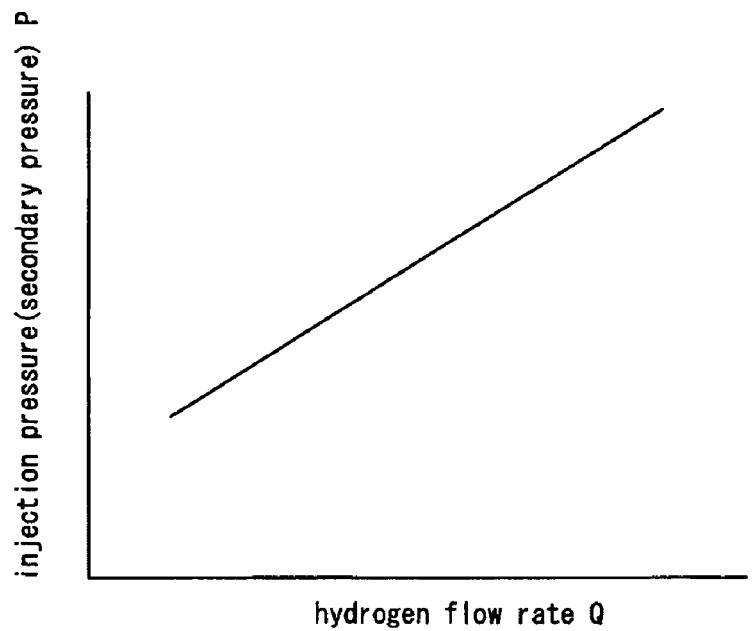
FIG. 9 is a graph showing the relationship between the injection pressure and the hydrogen flow rate.

FIG. 9 shows the output characteristic of the fluid control valve 100. In FIG. 9, the output characteristic is shown in relation of the hydrogen flow rate Q with respect to the injection pressure (secondary pressure) P. The flow rate of hydrogen gas to be injected through the gas injection nozzle 129 of the fluid control valve 100, which is required to obtain a predetermined pressure of hydrogen gas to be injected through the gas injection nozzle 129 of the fluid control valve 100, can be determined based on the output characteristic of the fluid control valve 100 shown in FIG. 9.

Figure 10:
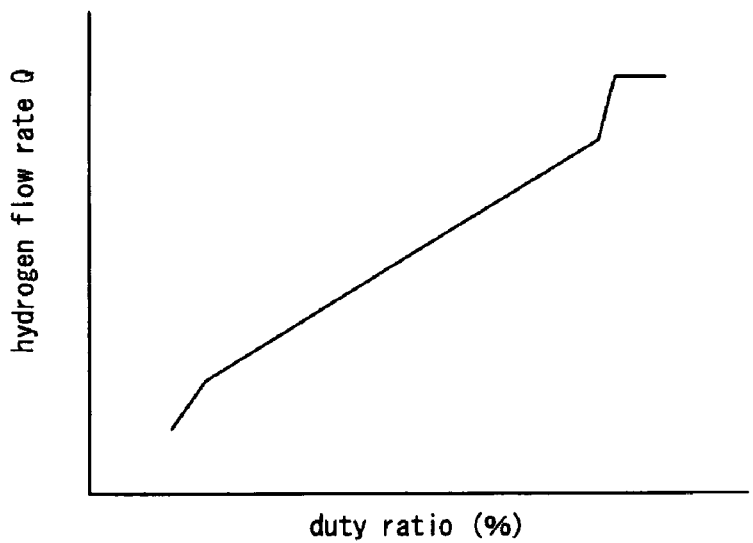
FIG. 10 is a graph showing the relationship between the hydrogen flow rate and the duty ratio of the power pulse supplied to the coil.

FIG. 10 shows the control characteristic of the fluid control valve 100. In FIG. 10, the control characteristic is shown in relation of the duty ratio (the duty ratio of the power pulse to be supplied to the coil 113 of the fluid control valve 100) with respect to the hydrogen flow rate Q. The duty ratio of the power pulse to be supplied to the coil 113 of the fluid control valve 100, which is required to obtain a predetermined flow rate of hydrogen gas to be injected through the gas injection nozzle 129 of the fluid control valve 100, can be determined based on the control characteristic of the fluid control valve 100 shown in FIG. 10.

Further, the power to be consumed by the fuel cell electric vehicle can be determined in advance according to the amount of depression of the accelerator pedal.

Therefore, the pressure of hydrogen gas corresponding to the amount of depression of the accelerator pedal 6 is determined from FIG. 8, and the injection pressure corresponding to the determined pressure of hydrogen gas is determined from FIG. 9. The duty ratio corresponding to the determined injection pressure is determined from FIG. 10, and the power pulse having the determined duty ratio is supplied to the coil 113 of the fluid control valve 100. Thus, power can be generated from the fuel cell 30 in proportion to the amount of depression of the accelerator pedal 6.

Next, an embodiment of the method of controlling the fluid control valve 100 by the control circuit 60 will be explained with reference to the flow chart shown in FIG. 6.

It is to be noted here that a set value X of the injection pressure and a set value Y of the duty ratio corresponding to the amount of depression of the accelerator pedal 6 are stored in a map database within the control circuit 60 or a storage circuit accessible to the control circuit 60, based on the characteristics shown in FIGS. 8 to 10 and the power consumption of the fuel cell electric vehicle corresponding to the amount of depression of the accelerator pedal 6.

In step S1, it is determined whether the ignition switch 4 is turned on or not, based, for example, on the operating-state detection signal. Go to step S2 if the ignition switch 4 is turned on, and stand by if the ignition switch 4 is t-turned off.

In step S2, starting operation is executed. For example, power is supplied to the coil of the cut-off valve 14 and the cut-off valve 14 is opened.

In step S3, the set value X of the injection pressure and the set value Y of the duty ratio corresponding to the amount of depression of the accelerator pedal 6 are read from the map database. When the accelerator pedal 6 is not in the depressed state, the set value X of the injection pressure and the set value Y of the duty ratio which are appropriate to the idling state, are read from the map database. The power pulse having the read set value Y of the duty ratio is supplied to the coil 113 of the fluid control valve 100.

In step S4, the pressure detection signal that indicates the injection pressure (secondary pressure) of hydrogen gas to be injected through the gas injection nozzle 129 of the fluid control valve 100, is read in from the pressure sensor 18.

In step S5, it is determined whether the injection pressure is higher than the injection pressure set value X. Go to step S6 if the injection pressure is higher than the injection pressure set value X, and go to step S7 if not.

In step S6, the duty ratio of the power pulse to be supplied to the coil 113 of the fluid control valve 100 is reduced. Then, go to step S9. Thus, the flow rate of hydrogen gas to be injected through the gas injection nozzle 129 of the fluid control valve 100 is reduced, and the injection pressure drops. The amount of reduction of the duty ratio can be appropriately chosen. In step S6, corrective action is taken to set the injection pressure to the injection pressure set value X.

In step S7, it is determined whether the injection pressure is lower than the injection pressure set value X. Go to step S8 if the injection pressure is lower than the injection pressure set value X, and go to step S9 if not (or if the injection pressure is equal to the injection pressure set value X.

In step S8, the duty ratio of the power pulse to be supplied to the coil 113 of the fluid control valve 100 is raised. Then, go to step S9. Thus, the flow rate of hydrogen gas to be injected through the gas injection nozzle 129 of the fluid control valve 100 is raised, and the injection pressure rises. The amount of increase of the duty ratio can be appropriately chosen. In step S8, corrective action is taken to set the injection pressure to the injection pressure set value X.

In step S9, it is determined whether the amount of depression of the accelerator pedal 6 has been changed or not. Return to step S4 if the amount of depression of the accelerator pedal has not been changed, and return to step S3 if it has been changed.

Further, one step, which is not shown, is provided on the way from step S3 to step S9. In this step, it is determined whether the ignition switch 4 is turned off or not. Stopping operation is executed if the ignition switch 4 is turned off. For example, power supply to the coil of the cut-off valve 14 is stopped and the cut-off valve 14 is closed. Further, power is supplied to the coil of the exhaust valve 36 and the exhaust valve 36 is opened. Thus, the hydrogen gas in the gas passage 50 is discharged to the air.

By using the above-described control method, the pressure of hydrogen gas to be injected through the gas injection nozzle 129 of the fluid control valve 100, or the pressure of hydrogen gas to be supplied to the fuel cell 30 (the generated energy of the fuel cell 30), can be controlled in proportion to the amount of depression of the accelerator pedal 6. Therefore, the supply of hydrogen gas to the fuel cell 30 can be properly controlled.

The method of controlling the fluid control valve 100 is not limited to the method described in the above embodiment. For example, another method may be used in which the injection pressure set value corresponding to the amount of depression of the accelerator pedal 6 is calculated in each case.

Further, as a method of controlling the power to be supplied to the coil 113 of the fluid control valve 100, various methods, other than the method of controlling the duty ratio, may be used.

Further, the above-described method of controlling the fluid control valve 100 can be suitably used as a method of controlling an impermeable fluid control valve. This method can also be applied to a fluid control valve having a rubber O-ring.

The present invention may be added to, changed, replaced with alternatives or otherwise modified without departing from the spirit and scope of the invention.

The impermeable joint between two of the members forming the valve body may be formed preferably by welding. However, in order to form an impermeable joint between two of the members forming the valve body, many methods may be used. For example, the impermeable joint may be formed by fusion of the joining portions of two members. Or, the impermeable joint may be formed by adhesion using an adhesive to join the joining portions of two members.

In the above embodiment, three impermeable joints have been described as being formed in the valve body having the body, the core, the valve seat and the ring. A plurality of joints, other than one or three joints, can be formed. Further, locations of the joints can be appropriately selected. In the above embodiment, the body 101 of the fluid control valve 100 has been described as being formed by coupling the upper body 103 and the lower body 105. However, the upper body 103 and the lower body 105 may be formed into one piece to form the body 101. In the above embodiment, the fluid control valve 100 has been described as being used to supply hydrogen gas to the fuel cell of the fuel cell electric vehicle. However, the fluid control valve 100 of this invention can be used for various other applications. For example, it can be used for supplying compressed natural gas to an internal combustion engine. A method of controlling the fluid control valve 100 having an impermeable joint is not limited to the control method described in the above embodiment, but other methods may be used. The fluid control valve 100 of this invention can also be used as a fluid control valve for opening and closing a gas outlet of the hydrogen storage container 12 shown in FIG. 1. Each of the additional features and method steps disclosed above may be utilized separately or in conjunction with other features and method steps.

What we claim is:

1. A fluid control valve, including a valve body having a fluid outlet, a movable valve that is movably disposed in directions that opens and closes the fluid outlet with respect to the valve body, a spring that generates a biasing force which moves the movable valve, a coil that generates an electromagnetic force which moves the movable valve, and a support plate that is attached to the valve body and supports the movable valve, wherein:

the movable valve includes an axial fluid passage formed along the axial direction on the radially inner side and a plurality of radial fluid passages formed along the radial directions between the axial fluid passage and the outer circumferential surface of the movable valve, the support plate has an outer circumferential portion formed along the circumferential direction on the radially outer side, an inner circumferential portion formed along the circumferential direction on the radially inner side and a plurality of elastically deformable support portions connected to the outer circumferential portion and the inner circumferential portion, each of the support portions including an outer radial connection extending radially inward from the outer circumferential portion, an inner radial connection extending radially outward from the inner circumferential portion, and a circumferential connection extending along the circumferential direction which is connected to the inner end of the associated outer radial connection and the outer end of the associated inner radial connection, wherein the adjacent support portions share the associated outer radial connection or the associated inner radial connection such that one of the adjacent support portions is formed into an S-shape while the other is formed into an inverted S-shape as viewed from the axial direction of the support plate, at least either the outer radial connection or the inner radial connection of at least two of the support portions is positioned so as to face the associated radial fluid passage formed in the movable valve such that the movable valve is prevented from being tilted with respect to the axial direction by forces acting upon at least either the outer radial connection or the inner radial connection of at least two of the support portions when the fluid passes through the radial fluid passages.

2. The fluid control valve as in claim 1 wherein the number of the support portions is the same as that of the radial fluid passages formed in the movable valve, and all of the outer radial connections and the inner radial connections of the support portions are respectively positioned so as to face the associated radial fluid passages.

3. A fluid control valve, including a valve body having a fluid outlet, a movable valve that is movably disposed in directions that opens and closes the fluid outlet with respect to the valve body, a spring that generates a biasing force which moves the movable valve, a coil that generates an electromagnetic force which moves the movable valve, and a support plate that is attached to the valve body and supports the movable valve, wherein:

the movable valve includes an axial fluid passage formed along the axial direction on the radially inner side and a plurality of radial fluid passages formed along the radial directions between the axial fluid passage and the outer circumferential surface of the movable valve, the support plate has an outer circumferential portion formed along the circumferential direction on the radially outer side, an inner circumferential portion formed along the circumferential direction on the radially inner side and a plurality of elastically deformable support portions connected to the outer circumferential portion and the inner circumferential portion, each of the support portions including an outer radial connection extending radially inward from the outer circumferential portion, an inner radial connection extending radially outward from the inner circumferential portion, and a circumferential connection extending along the circumferential direction which is connected to the inner end of the associated outer radial connection and the outer end of the associated inner radial connection, wherein the support plate has a plurality of outer slits extending along the circumferential direction on the radially outer side and a plurality of inner slits extending along the circumferential direction on the radially inner side, each of the outer slits being formed by the outer circumferential portion, the outer radial connections and the circumferential connections of the adjacent support portions, and each of the inner slits being formed by the inner circumferential portion and the inner radial connections and the circumferential connections of the adjacent support portions, both of the circumferential ends of each of the outer slits have an arcuate shape having a diameter larger than the width of the circumferential middle portion of each of the outer slits, and both of the circumferential ends of each of the inner slits have an arcuate shape having a diameter larger than the width of the circumferential middle portion of each of the inner slits, at least either the outer radial connection or the inner radia connection of at least two of the support portions is positioned so as to face the associated radial fluid passage formed in the movable valve such that the movable valve is prevented from being tilted with respect to the axial direction by forces acting upon at least either the outer radial connection or the inner radial connection of at least two of the support portions when the fluid passes through the radial fluid passages.

4. A fluid control valve, including a valve body having a fluid outlet, a movable valve that is movably disposed in directions that opens and closes the fluid outlet with respect to the valve body, a spring that generates a biasing force which moves the movable valve, a coil that generates an electromagnetic force which moves the movable valve, and a support plate that is attached to the valve body and supports the movable valve, wherein:

the movable valve includes an axial fluid passage formed along the axial direction on the radially inner side and a plurality of radial fluid passages formed along the radial directions between the axial fluid passage and the outer circumferential surface of the movable valve, the support plate has an outer circumferential portion formed along the circumferential direction on the radially outer side, an inner circumferential portion formed along the circumferential direction on the radially inner side and a plurality of elastically deformable support portions connected to the outer circumferential portion and the inner circumferential portion, each of the support portions including an outer radial connection extending radially inward from the outer circumferential portion, an inner radial connection extending radially outward from the inner circumferential portion, and a circumferential connection extending along the circumferential direction which is connected to the inner end of the associated outer radial connection and the outer end of the associated inner radial connection, wherein the support plate has a plurality of outer slits extending along the circumferential direction in the radially outer side and a plurality of inner slits extending along the circumferential direction on the radially inner side, each of the outer slits being formed by the outer circumferential portion, the outer radial connections and the circumferential connections of the adjacent support portions such that the width of each of its circumferential ends is larger than the width of its circumferential middle portion, and each of the inner slits being formed by the inner circumferential portion, the inner radial connections and the circumferential connections of the adjacent support portions such that the width of each of its circumferential ends is larger than the width of its circumferential middle portion, at least either the outer radial connection or the inner radial connection of at least two of the support portions is positioned so as to face the associated radial fluid passage formed in the movable valve such that the movable valve is prevented from being tilted with respect to the axial direction by forces acting upon at least either the outer radial connection or the inner radial connection of at least two of the support portions when the fluid passes through the radial fluid passages.

* * * * *